United States Patent
Chin-Chin

(10) Patent No.: US 6,837,134 B2
(45) Date of Patent: Jan. 4, 2005

(54) STRING SAW HAVING DUST COLLECTION AND CHIP DRAINAGE MECHANISM

(76) Inventor: Chang Chin-Chin, No. 2, Alley 113, Lane 967, San Feng Road, Feng Yuan, Taichung Hsien (TW)

( * ) Notice: Subject to any disclaimer, the term of this patent is extended or adjusted under 35 U.S.C. 154(b) by 0 days.

(21) Appl. No.: 10/359,417

(22) Filed: Feb. 6, 2003

(65) Prior Publication Data

US 2004/0154446 A1 Aug. 12, 2004

(51) Int. Cl.[7] .............................................. B27B 13/02
(52) U.S. Cl. ............................. 83/100; 83/788; 30/380; 144/252.2
(58) Field of Search ............................. 83/98, 100, 788; 30/380; 144/252.1, 252.2

(56) References Cited

U.S. PATENT DOCUMENTS

| | | | | |
|---|---|---|---|---|
| 1,496,035 A | * | 6/1924 | Thomson ..................... | 83/168 |
| 3,669,163 A | * | 6/1972 | Crane .......................... | 83/100 |
| 4,491,047 A | * | 1/1985 | Butkiewicz et al. .......... | 83/100 |
| 6,679,145 B1 | * | 1/2004 | Lee .............................. | 83/100 |
| 2004/0007109 A1 | * | 1/2004 | Chiang .......................... | 83/98 |

* cited by examiner

*Primary Examiner*—Stephen Choi

(57) ABSTRACT

A string saw includes a housing, and an air box. The housing includes a first casing and a second casing combined with each other. The air box is mounted in the housing and has an inside formed with a receiving chamber communicating with the storage space of the first casing, so that the cut chips during the sawing process can be introduced from the storage space of the first casing into the receiving chamber of the air box. Thus, the string saw can provide the dust collection and chip drainage function.

6 Claims, 4 Drawing Sheets

STRING SAW HAVING DUST COLLECTION AND CHIP DRAINAGE MECHANISM

BACKGROUND OF THE INVENTION

1. Field of the Invention

The present invention relates to a string saw, and more particularly to a string saw having a dust collection and chip drainage mechanism for providing the dust collection and chip drainage function.

2. Description of the Related Art

A conventional string saw in accordance with the prior art comprises a housing, a rotation shaft rotatably mounted in the housing, a motor mounted on the housing for rotating the rotation shaft, a drive wheel secured on the rotation shaft to rotate therewith, a driven wheel rotatably mounted in the housing, and an endless saw blade mounted between the drive wheel and the driven wheel, so that the driven wheel is rotated in concert with the drive wheel. In operation, the rotation shaft is rotated by the motor to rotate the drive wheel which rotates the driven wheel through the saw blade, so that the saw blade is moved successively by rotation of the drive wheel and the driven wheel, so as to cut a workpiece (not shown) that is fed into the gap defined between the drive wheel and the driven wheel.

However, the conventional string saw does not have the dust collection and chip drainage function, so that the cut chips (or dust) of the workpiece produced during operation of the saw blade are easily collected in the gap defined between the drive wheel and the driven wheel, thereby affecting the normal operation of the conventional string saw.

SUMMARY OF THE INVENTION

The present invention is to mitigate and/or obviate the disadvantage of the conventional string saw.

The primary objective of the present invention is to provide a string saw having a dust collection and chip drainage mechanism.

Another objective of the present invention is to provide a string saw, wherein the cut chips (or dust) of the workpiece produced during operation of the saw blade are introduced into and stored in the storage space of the first casing, and are drained outward to the ambient environment by the air box, thereby providing the dust collection and chip drainage function.

A further objective of the present invention is to provide a string saw, wherein the power source of the air box is supplied by the rotation shaft which is rotated by the motor during the normal operation of the string saw, without having to use an additional power source, thereby saving energy and costs.

In accordance with the present invention, there is provided a string saw having a dust collection and chip drainage mechanism, comprising a housing, and an air box, wherein:

the housing includes a first casing and a second casing combined with each other, the first casing of the housing is formed with a storage space; and the air box is mounted in the housing and has an inside formed with a receiving chamber communicating with the storage space of the first casing, so that cut chips can be introduced from the storage space of the first casing into the receiving chamber of the air box.

Further benefits and advantages of the present invention will become apparent after a careful reading of the detailed description with appropriate reference to the accompanying drawings.

DETAILED DESCRIPTION OF THE INVENTION

Figure 1:
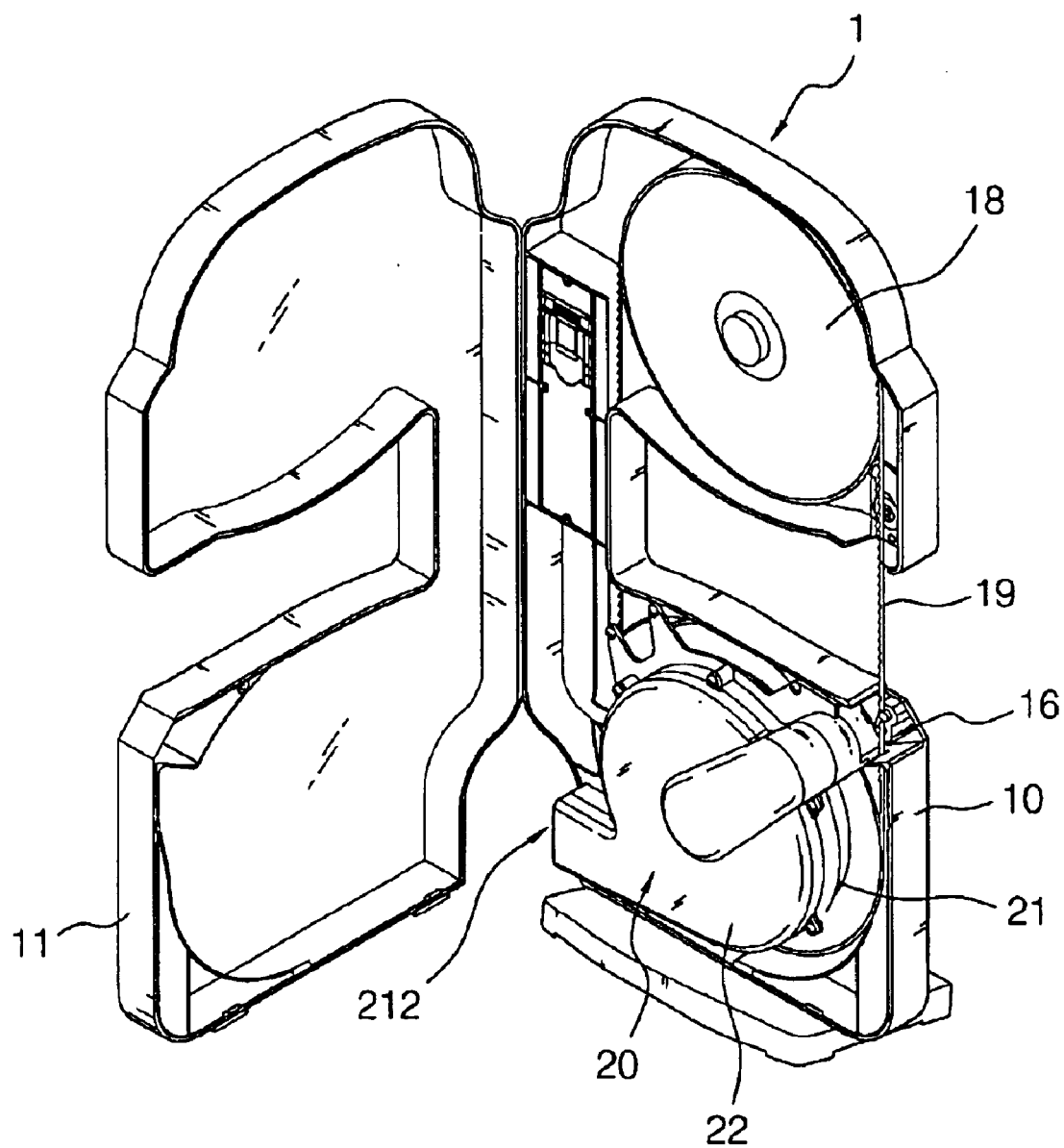
FIG. 1 is a perspective assembly view of a string saw having a dust collection and chip drainage mechanism in accordance with the preferred embodiment of the present invention.
Figure 2:
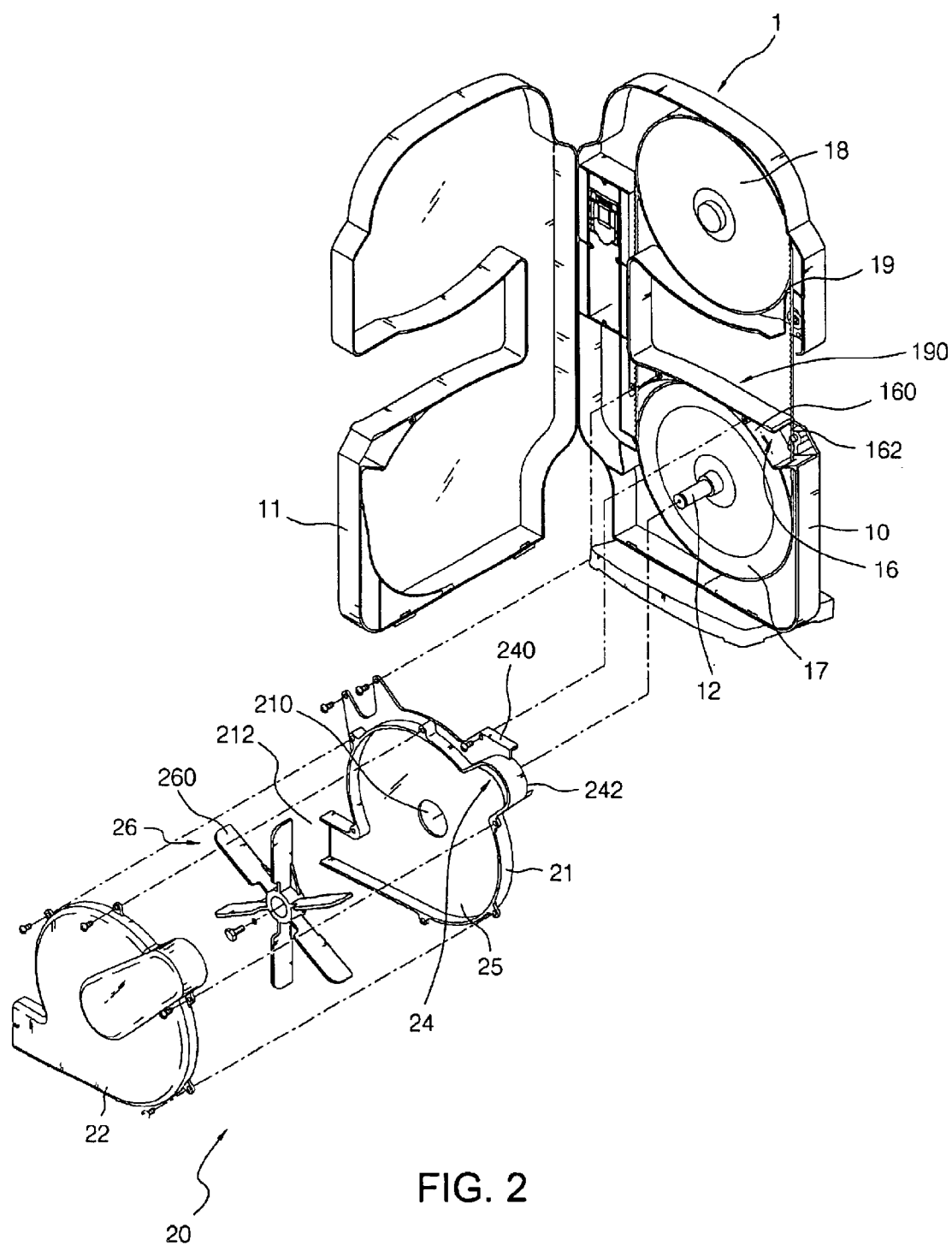
FIG. 2 is an exploded perspective view of the string saw having a dust collection and chip drainage mechanism in accordance with the preferred embodiment of the present invention.
Figure 3:
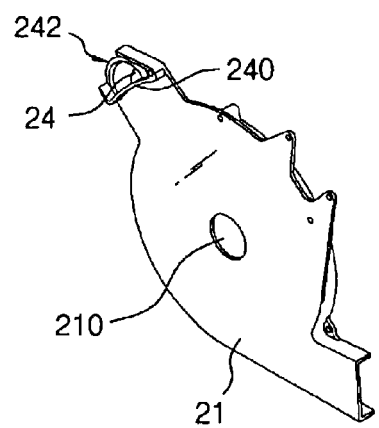
FIG. 3 is a perspective view of a first cover of the air box of the string saw having a dust collection and chip drainage mechanism in accordance with the preferred embodiment of the present invention.

Referring to the drawings and initially to FIGS. 1–3, a string saw having a dust collection and chip drainage mechanism in accordance with the preferred embodiment of the present invention comprises a housing 1, an air box 20, and a drive unit 3.

The housing 1 includes a first casing 10 and a second casing 11 combined with each other. The housing 1 further includes a rotation shaft 12 rotatably mounted in the first casing 10, a drive wheel 17 secured on the rotation shaft 12 to rotate therewith, a driven wheel 18 rotatably mounted in the first casing 10, and an endless saw blade 19 mounted between the drive wheel 17 and the driven wheel 18, so that the driven wheel 18 is rotated in concert with the drive wheel 17.

Figure 5:
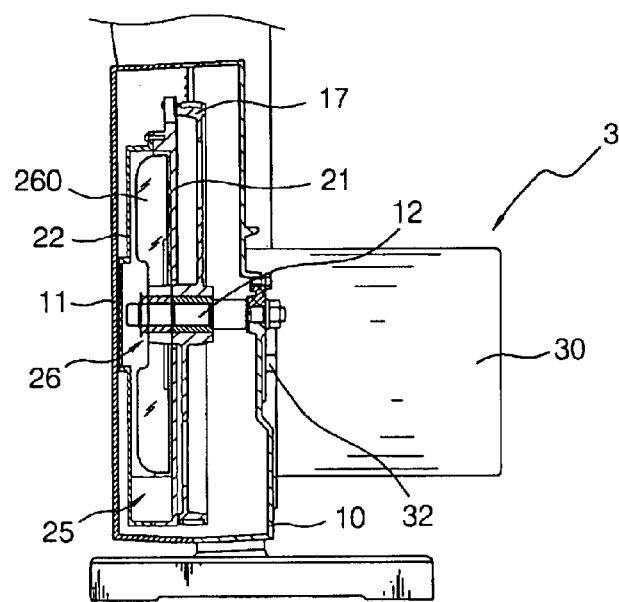
FIG. 5 is a cross-sectional view of the string saw having a dust collection and chip drainage mechanism taken along line 5—5 as shown in FIG. 4.
Figure 6:
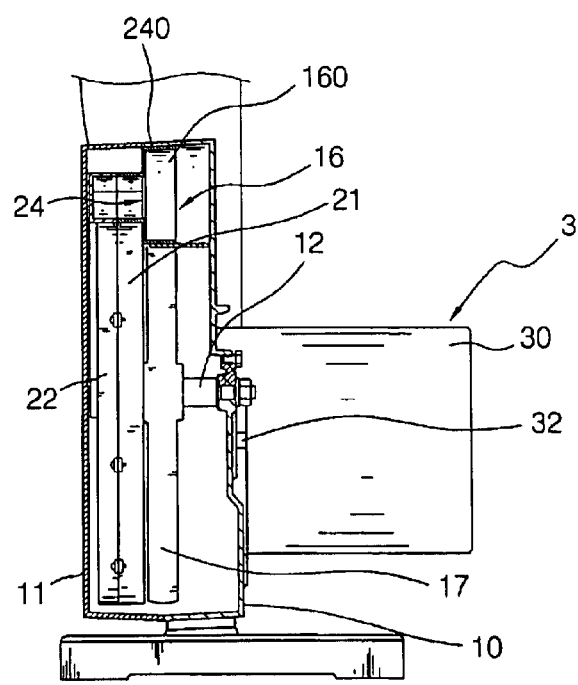
FIG. 6 is a cross-sectional view of the string saw having a dust collection and chip drainage mechanism taken along line 6—6 as shown in FIG. 4.

As shown in FIGS. 5 and 6, the drive unit 3 includes a motor 30 mounted on the first casing 10, a propeller shaft 32 rotatably mounted on the motor 30, and a reduction unit (not shown) co-operating with the propeller shaft 32.

In operation, the propeller shaft 32 is rotated by the motor 30, so as to drive and rotate the rotation shaft 12 by co-operation of the reduction unit. Then, the drive wheel 17 is rotated by rotation of the rotation shaft 12, so as to rotate the driven wheel 18 through the saw blade 19. Thus, the saw blade 19 is moved successively by rotation of the drive wheel 17 and the driven wheel 18, so as to cut a workpiece (not shown) that is fed into the gap 190 defined between the drive wheel 17 and the driven wheel 18.

In addition, the first casing 10 of the housing 1 is formed with a storage space 16 for storing the cut chips of the workpiece. Preferably, the storage space 16 of the first casing 10 has a closed wall 160 formed with an opening 162 for passage of the saw blade 19.

The air box 20 is mounted in the housing 1, and has an inside formed with a receiving chamber 25 (see FIG. 4) communicating with the storage space 16 of the first casing 10, so that the cut chips of the workpiece can be introduced from the storage space 16 of the first casing 10 into the receiving chamber 25 of the air box 20.

The air box 20 includes a first cover 21, a second cover 22, and a ventilating fan 26.

The first cover 21 of the air box 20 is secured on the first casing 10 of the housing 1. The first cover 21 of the air box 20 has a center formed with a through hole 210 for passage of the rotation shaft 12. The first cover 21 of the air box 20 has a first end formed with a guide hole 24 communicating with the storage space 16 of the first casing 10 and the receiving chamber 25 of the air box 20. The guide hole 24 of the first cover 21 has a closed wall 240 inserted into the closed wall 160 of the storage space 16 of the first casing 10, so that the closed wall 240 of the guide hole 24 of the first cover 21 and the closed wall 160 of the storage space 16 of the first casing 10 form a closed space. Preferably, the closed wall 240 of the guide hole 24 of the first cover 21 is formed with an opening 242 for passage of the saw blade 19. The first cover 21 of the air box 20 has a second end formed with a drain hole 212 communicating with the receiving chamber 25 of the air box 20.

The second cover 22 of the air box 20 is combined with the first cover 21. The receiving chamber 25 of the air box 20 is defined between the first cover 21 and the second cover 22.

The ventilating fan 26 of the air box 20 is mounted on the rotation shaft 12 and located in the receiving chamber 25 of the air box 20 for introducing the cut chips of the workpiece contained in the receiving chamber 25 of the air box 20 to the ambient environment through the drain hole 212. The ventilating fan 26 of the air box 20 includes a plurality of fan blades 260.

Figure 4:
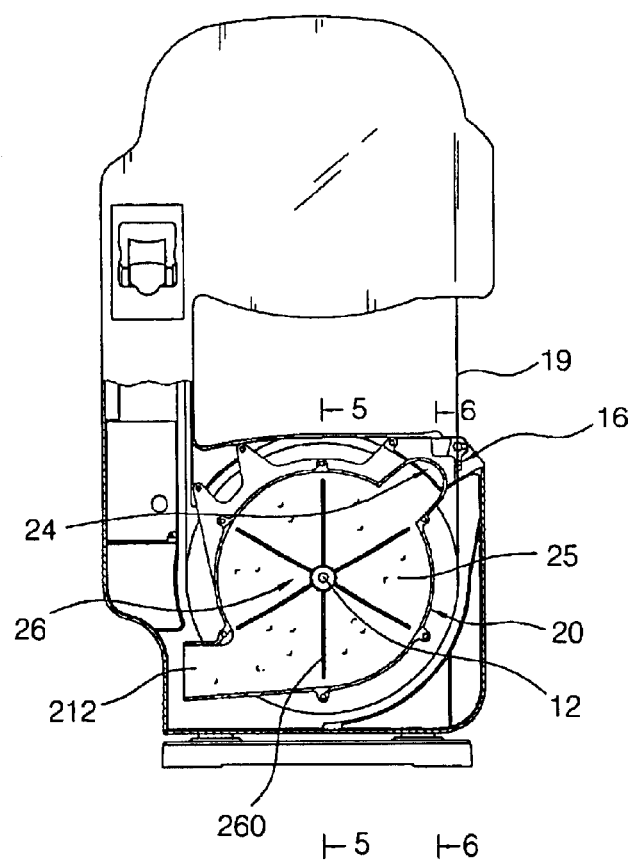
FIG. 4 is a side plan cross-sectional view of the string saw having a dust collection and chip drainage mechanism as shown in FIG. 1.

In practice, referring to FIGS. 4–6 with reference to FIGS. 1–3, when the rotation shaft 12 is rotated by the motor 30 during operation of the string saw, the ventilating fan 26 mounted on the rotation shaft 12 is also rotated in the receiving chamber 25 of the air box 20, thereby draining the air contained in the receiving chamber 25 of the air box 20 to the ambient environment through the drain hole 212, so that the receiving chamber 25 of the air box 20 is disposed at a negative pressure state, thereby producing a suction force. Thus, the cut chips of the workpiece produced during operation of the saw blade 19 are introduced into the storage space 16 of the first casing 10 through the opening 162 by the suction produced in the receiving chamber 25 of the air box 20. Then, the cut chips of the workpiece are introduced through the guide hole 24 of the first cover 21 into the receiving chamber 25 of the air box 20. Then, the cut chips of the workpiece are drained outward to the ambient environment through the drain hole 212 by rotation of the fan blades 260 of the ventilating fan 26.

Accordingly, the string saw having a dust collection and chip drainage mechanism in accordance with the preferred embodiment of the present invention has the following advantages.

1. The cut chips (or dust) of the workpiece produced during operation of the saw blade 19 are introduced into and stored in the storage space 16 of the first casing 10, and are drained outward to the ambient environment by the air box 20, thereby providing the dust collection and chip drainage function.

2. The power source of the air box 20 is supplied by the rotation shaft 12 which is rotated by the motor 30 during the normal operation of the string saw, without having to use an additional power source, thereby saving energy and costs.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A string saw having a dust collection and chip drainage mechanism, comprising a housing, and an air box, wherein:

the housing includes a first casing and a second casing combined with each other, the housing having a rotation shaft rotatably mounted in the first casing, the first casing of the housing formed with a storage space having a closed wall;

a drive wheel secured on the rotation shaft, a driven wheel rotatably mounted in the first casing, and an endless saw blade mounted between the drive wheel and the driven wheel; and the air box is mounted in the housing and has an inside formed with a receiving chamber communicating with the storage space of the first casing, so that cut chips can be introduced from the storage space of the first casing into the receiving chamber of the air box, the air box including a first cover having a first end formed with a guide hole communicating with the storage space of the first casing and the receiving chamber of the air box, and a second end formed with a drain hole communicating with the receiving chamber of the air box, the guide hole having a closed wall inserted into the closed wall of the storage space of the first casing, so that the closed wall of the guide hole of the first cover and the closed wall of the storage space of the first casing form a closed space, the first cover having a center formed with a through hole for passage of the rotation shaft that is rotatably mounted in the first casing, a second cover combined with the first cover, and the receiving chamber of the air box defined between the first cover and the second cover, and a ventilating fan rotatably mounted in the receiving chamber of the air box for introducing the cut chips of the workpiece contained in the receiving chamber of the air box.

2. The string saw having a dust collection and chip drainage mechanism in accordance with claim 1, wherein the storage space of the first casing has the closed wall formed with an opening for passage of the endless saw blade.

3. The string saw having a dust collection and chip drainage mechanism in accordance with claim 1, wherein the first cover of the air box is secured on the first casing of the housing.

4. The string saw having a dust collection and chip drainage mechanism in accordance with claim 1, wherein the closed wall of the guide hole of the first cover is formed with an opening for passage of the endless saw blade.

5. The string saw having a dust collection and chip drainage mechanism in accordance with claim 1, further comprising a drive unit for rotating the rotation shaft.

6. The string saw having a dust collection and chip drainage mechanism in accordance with claim 5, wherein the drive unit includes a motor mounted on the first casing.

* * * * *